J. P. ANDERSON.
COMBINATION GAS FILLER AND GAGE FOR AUTOMOBILES.
APPLICATION FILED NOV. 29, 1915.
1,209,100.
Patented Dec. 19, 1916.
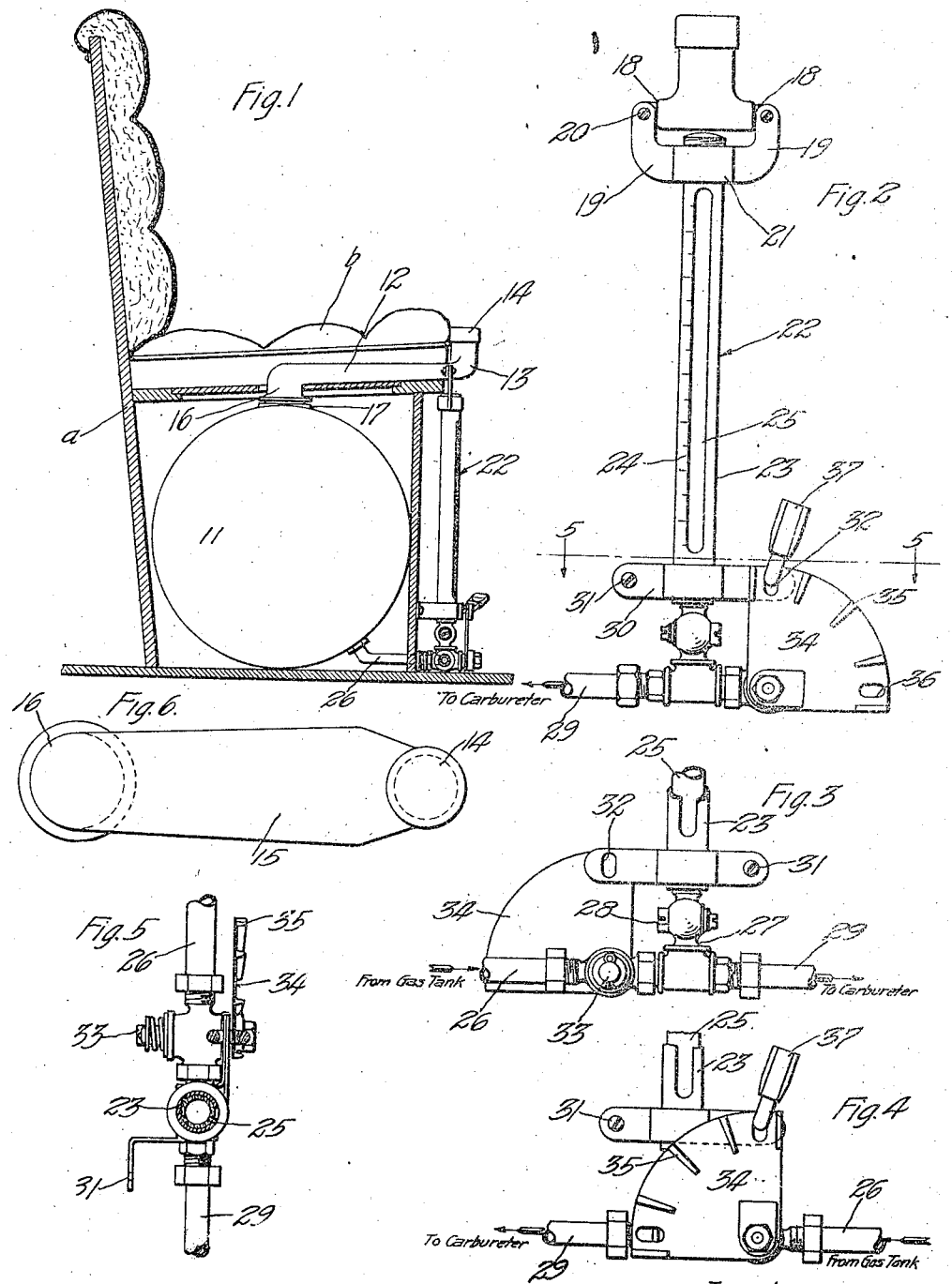
Inventor
John P. Anderson

UNITED STATES PATENT OFFICE.

JOHN P. ANDERSON, OF LOS ANGELES, CALIFORNIA, ASSIGNOR OF ONE-THIRD TO MAX GREEN, OF LOS ANGELES, CALIFORNIA.

COMBINATION GAS FILLER AND GAGE FOR AUTOMOBILES.

1,209,100.  Specification of Letters Patent.  Patented Dec. 19, 1916.

Application filed November 29, 1915. Serial No. 64,205.

*To all whom it may concern:*

Be it known that I, JOHN P. ANDERSON, a citizen of the United States, residing at Los Angeles, in the county of Los Angeles and State of California, have invented new and useful Improvements in Combination Gas Fillers and Gages for Automobiles, of which the following is a specification.

My invention relates to storage tanks for automobiles.

The invention comprises an improved filler for the tank located at the forward edge of a seat of the automobile, and means for detachably securing said filler in position for use.

In the accompanying drawings, which form a part of this specification, I have illustrated a convenient and practical embodiment of my invention, and in which:

Figure 1 is an end view of the driver's seat, showing the gasolene tank to which my invention is applied. Fig. 2 is a front elevation, on an enlarged scale, of the filler, gage and locking device, the latter being in its open position. Fig. 3 is a rear view of the lower part of the device shown in Fig. 2. Fig. 4 is a front elevation of the lower part of the locking device showing the latter in its locked position. Fig. 5 is a horizontal cross-sectional view taken on line 5—5 of Fig. 2. Fig. 6 is a top plan view of the filler.

A represents the driver's seat of an automobile under which the main gasolene tank 11 is positioned. The same is filled by means of my improved filler 12, which consists of a vertical mouth-piece 13 closed by a cap 14, the horizontal body portion 15, and the screw-threaded end 16 which engages a screw-threaded inlet opening 17 of the tank. The vertical mouth-piece of the filler is arranged at the front of the seat somewhat below the cushion *b*, so that the same will be accessible for filling the tank and yet will be out of the way and not interfere with the driver. The body portion is located between the cushion and the solid frame of the seat. The cushion may be cut away to accommodate the body portion of the filler. As clearly shown in Fig. 1 and Fig. 6, the forward part of the central portion is wider and flatter than the rear portion, the filler being so proportioned that its cross-sectional area is the same throughout its length, so that there will be, in filling the tank with gasolene, no resistance to the fluid passing from the mouth to the tank. A pair of horizontally apertured lugs 18 extend from opposite sides of the forward part of the central portion of the filler to which a pair of arms 19 is secured by means of screws 20. These arms extend from opposite sides of a threaded collar 21, which engages the threaded upper end of a gasolene gage 22. The gage consists of a tubular metal housing 23 provided with a vertical slot 24. One of the edges of said slots is provided with gradations to indicate the level of gasolene in the tank. A glass tube 25 is mounted in said tubular housing and is in fluid connection with the tank by means of conduit 26, and a short tubular connection 27 which connects said housing to said conduit. Said connection 27 is provided with a cut-off valve 28, which serves to close the connection between said glass and the tank in case of breakage of the glass tube.

29 represents a conduit leading from the conduit 26 to the carbureter (not shown). The lower end of the tubular housing 23 is provided with a strap 30 one end of which is fastened to the front side of the seat by means of a screw 31. The other end is provided with an aperture 32. A cut-off valve 33 is located in the conduit 26 below said aperture 32 and is operated by a locking member 34 consisting of a metal plate having the shape of a quadrant. The curved periphery of said quadrant is provided with spaced lugs 35 suitable to be engaged by the fingers of the operator in turning the locking member to close or open the cut-off valve 33. At the extremities of the curved periphery are a pair of apertures 36 adapted to register with the aperture 32 when the locking member is turned in its locking or open position. A padlock 37 passing through the apertures 32 and 36, securely locks the cut-off valve 33 in its closed position.

Operation: From the foregoing description, the operation of my combined filler, gage and locking device will be obvious. The gasolene tank may be filled from the filler 12 without the removal of the seat cushion *b*. By slightly bending forward, the operator of the car will read the level of gasolene from the gage 22. If he desires to prevent the use of the car by unauthorized persons during his absence, he may cut off the feed to the carbureter by turning the locking member to the position shown in Fig. 4, which will close the valve 33, shutting off the supply of gasolene from the tank, and by attaching the padlock 37, the locking member will be securely maintained in its locking position, thus protecting the car from theft by making the operation thereof impossible.

I claim:

1. The combination of a seat of a motor-propelled vehicle, a storage tank under said seat, a tank filler leading from said tank to the forward edge of said seat, a gage connected to said storage tank and disposed below the forward end of said filler, means for detachably securing the forward end of said filler to the upper end of said gage and a conduit leading from said storage tank to the carbureter of the vehicle engine.

2. The combination of a seat of a motor-propelled vehicle, a storage tank under said seat, a tank filler leading from said tank to the forward edge of said seat, a gage connected to said storage tank and disposed below the forward end of said filler, the upper end of said gage being threaded, a threaded collar screwing on said upper end of said gage, ears on said collar, ears on the forward end of said filler adapted to register with the ears on said collar, means for securing said ears together, and a conduit leading from said storage tank to the carbureter of the vehicle engine.

3. The combination of a seat of a motor-propelled vehicle, a storage tank under said seat, said tank being provided with a threaded inlet, a tank filler, one end of which is threaded to screw into said threaded inlet, said filler leading from said inlet to the forward edge of said seat, a gage connected to said storage tank and disposed below the forward end of said filler, means for detachably securing the forward end of said filler to the upper end of said gage and a conduit leading from said tank to the carbureter of the vehicle engine.

In testimony whereof I have signed my name to this specification.

JOHN P. ANDERSON.